(12) United States Patent
Papakipos et al.

(10) Patent No.: US 6,774,895 B1
(45) Date of Patent: Aug. 10, 2004

(54) SYSTEM AND METHOD FOR DEPTH CLAMPING IN A HARDWARE GRAPHICS PIPELINE

(75) Inventors: Matthew N. Papakipos, Palo Alto, CA (US); Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/061,441

(22) Filed: Feb. 1, 2002

(51) Int. Cl.[7] ............................................. G06T 15/40
(52) U.S. Cl. ........................................................ 345/422
(58) Field of Search ........................................ 345/422

(56) References Cited

U.S. PATENT DOCUMENTS

| | | | | |
|---|---|---|---|---|
| 5,083,287 A | * | 1/1992 | Obata et al. | 345/426 |
| 5,905,504 A | * | 5/1999 | Barkans et al. | 345/597 |
| 5,960,213 A | * | 9/1999 | Wilson | 710/2 |
| 6,597,363 B1 | * | 7/2003 | Duluk et al. | 345/506 |
| 6,618,048 B1 | * | 9/2003 | Leather | 345/422 |
| 2002/0018063 A1 | * | 2/2002 | Donovan et al. | 345/426 |

OTHER PUBLICATIONS

Segal et al., The Open GL® Graphics System: A Specification (Version 1.3), Aug. 14, 2001, Mountain View, CA.
Segal et al., The Open GL® Graphics System: A Specification (Version 1.2.1), Apr. 1, 1999, Mountain View, CA.
Segal, et al. "Fast Shadows and Lighting Effects Using Texture Mapping" Computer Graphics, 26, 2, Jul. 1992.

* cited by examiner

*Primary Examiner*—Matthew C. Bella
*Assistant Examiner*—Greg F. Cunningham
(74) *Attorney, Agent, or Firm*—Silicon Valley IP Group, PC; Kevin J. Zilka

(57) ABSTRACT

A system, method and computer program product are provided for depth clamping in a hardware graphics pipeline. Initially, a depth value is identified. It is then determined as to whether a hardware graphics pipeline is operating in a depth clamping mode. If the hardware graphics pipeline is operating in the depth clamping mode, the depth value is clamped within a predetermined range utilizing the hardware graphics pipeline.

24 Claims, 11 Drawing Sheets

SYSTEM AND METHOD FOR DEPTH CLAMPING IN A HARDWARE GRAPHICS PIPELINE

FIELD OF THE INVENTION

The present invention relates to computer graphics, and more particularly to rasterization of 3D primitives within a graphics pipeline.

BACKGROUND OF THE INVENTION

Traditional graphics rendering hardware clips geometric primitives (polygons, lines, points, etc.) to a view volume prior to rasterization based on the vertices that make up each primitive. Typically, the view volume is defined by six clipping planes (top, bottom, left, right, front, and back) and the clipping process uses homogeneous clip coordinates. After clipping and a perspective divide, vertex coordinates are referred to as "normalized device coordinates". Further viewport and depth range transformations (i.e. a scale and bias) convert normalized device coordinates to window coordinates. Subsequent primitive assembly, rasterization, and interpolation steps use these window coordinates.

Clipping based on the left, right, top, and bottom clip planes guarantees that the rasterized pixels for a clipped primitive are within the rectangular screen region defined by the viewport. Additionally, clipping based on the near and far clip planes guarantees that the depth values for rasterized pixels are within the representable range of the depth buffer (i.e. 16-bit or 24-bit integers).

Use of near and far plane clipping is well established. The OpenGL® and Direct3D® programming interfaces both assume near and far plane clipping. Ignoring the near and far clip planes has been discussed in the literature and hardware implementations of such rasterizers are available. For more information such topic, reference may be made to: Olano, Marc and Trey Greer, "Triangle Scan Conversion Using 2D Homogeneous Coordinates", Proceedings of the 1997 SIGGRAPH/Eurographics Workshop on Graphics Hardware (Los Angeles, Calif., Aug. 2–4, 1997), ACM SIGGRAPH, New York, 1995; and James Blinn, Jim Blinn's Corner: A Trip Down the Graphics Pipeline, Morgan Kaufmann, 1996; which are each incorporated herein by reference in their entirety.

Prior art FIG. 1 illustrates a clipping operation 10 involving a near plane 12 and a far plane 14. During such clipping operation 10, the rasterization of primitives 16 that extend beyond such near plane 12 and far plane 14 are truncated at the planes. A primitive 11 entirely behind the far clip plane 14 or a primitive 13 entirely in front of the near clip plane 16 is eliminated entirely. As shown in FIG. 1, the foregoing truncation may involve defining additional triangles 18 at the near plane 12 and far plane 14.

Mathematically, the primitives may, in fact, extend beyond the near and/or far clip planes (12 and 16), but truncation of the primitive occurs for the sake of rasterization hardware which traditionally uses fixed-point math for depth values for reasons of hardware efficiency and performance. Such operations are limited in their numeric range.

In several cases, near and far plane clipping is undesirable. Polygons such as an unbounded ground plane going off into the horizon are clipped to the far clip plane rather than extending to the horizon line. There is thus a need for a system and method capable of permitting such polygons to be rasterized correctly even if otherwise incorrect depth values result.

Another situation where near and far plane clipping is undesirable is stenciled shadow volumes for rendering shadowed scenes. Shadow volume algorithms rely on drawing closed polygonal boundaries to separate shadowed regions from lit regions. Unfortunately, when shadow volumes are clipped by the far and/or near clip planes, these polygonal boundaries are no longer closed due to clipping. This leads to incorrect shadow determination. There is thus a further need for a system and method capable of permitting shadow volumes to be rendered without shadow determination artifacts caused by far and/or near plane clipping.

DISCLOSURE OF THE INVENTION

A system, method and computer program product are provided for depth clamping in a hardware graphics pipeline. Initially, a depth value is identified. It is then determined as to whether a hardware graphics pipeline is operating in a depth clamping mode. If the hardware graphics pipeline is operating in the depth clamping mode, the depth value is clamped within a predetermined range utilizing the hardware graphics pipeline.

In one embodiment, the depth value may be associated with a primitive, a clipped portion of a primitive, a pixel, and/or a fragment. Further, the clamping may be carried out in a raster operation (ROP) module of the hardware graphics pipeline.

In another embodiment, the predetermined range may be defined by a near plane and a far plane. Further, the predetermined range may be programmable. As an option, the depth value may be clamped for shadow volume rendering.

In still another embodiment, it may be determined whether the hardware graphics pipeline is operating in the depth clamping mode utilizing a control bit. As an option, the control bit may indicate that the hardware graphics pipeline is not operating in the depth clamping mode by default. In such embodiment, a data structure for depth clamping may be stored in memory in a hardware graphics pipeline. Such data structure may include a control object for indicating whether a hardware graphics pipeline is operating in a depth clamping mode. In use, a depth value may be clamped within a predetermined range utilizing the hardware graphics pipeline, if the control object indicates that the hardware graphics pipeline is operating in the depth clamping mode.

As an option, a second clamping of the depth value may be performed within a second predetermined range utilizing the hardware graphics pipeline. Such second predetermined range may be defined between zero (0) and a maximum value associated with the hardware graphics pipeline.

In still yet another embodiment, the depth value may be converted from a first representation to a second representation. Optionally, the first representation may be a fixed-point representation and the second representation may be a floating-point representation. In the alternative, the first representation may be a floating-point representation and the second representation may be a fixed-point representation.

If the hardware graphics pipeline is not operating in the depth clamping mode, a clipping operation may be performed. Such clipping operation may be carried out in a raster operation (ROP) module of the hardware graphics pipeline.

Optionally, the depth clamping mode may be defined by a graphics application program interface. Moreover, the depth clamping mode may be defined by an extension to a graphics application program interface.

Another system, method and computer program product are provided for depth clamping involving a fragment in a hardware graphics pipeline. Initially, a depth value of a fragment is received. Subsequently, the depth value of the fragment is clamped within a predetermined range utilizing a hardware graphics pipeline.

Still another system, method and computer program product are provided for depth clamping in a hardware graphics pipeline. Initially, a primitive is received. Next, it is determined whether a hardware graphics pipeline is operating in a predetermined mode. If the hardware graphics pipeline is operating in the predetermined mode, a portion of the primitive is projected to at least one of a near plane and a far plane utilizing the hardware graphics pipeline.

Still yet another system, method and computer program product are provided for depth clamping in a hardware graphics pipeline. Initially, a depth value is identified for a graphics primitive. It is then determined as to whether a hardware graphics pipeline is operating in a depth clamping mode. If the hardware graphics pipeline is operating in the depth clamping mode, the graphics primitive is split into a plurality of portions. At least one of the portions has all depth values clamped to a predetermined value utilizing the hardware graphics pipeline.

The present technique thus provides a hardware mechanism, possibly controlled by a graphics application programming interface, where pixel coverage is determined either with consideration of near and far clip planes (i.e., conventional clipping operation) or without consideration of the near and far clip planes (i.e., a "depth clamping" operation).

When rasterized fragments are generated with interpolated depth values beyond the range of a fixed-point depth buffer numeric range (due to the possible lack of near and far plane clipping), out-of-range interpolated depth values are clamped to the current depth range setting, guaranteeing that post-clamping depth values are within the depth buffer representable range prior to depth testing. This depth clamping operation is carried out when clipping ignores the near and far clip planes. To handle the potentially unbounded range for interpolated depth values without near and far plane clipping, depth value interpolation may be performed with floating-point math. Further, the depth clamping operation may be performed on a per-fragment basis.

Additionally, rasterized fragments with clip-space "w" values (usually understood to encode the eye-space distance from the viewer) that are less than or equal to zero may be discarded utilizing the aforementioned second clamping operation. This may avoid both rendering fragments that are logically "behind" the viewer and numerically unstable operations (i.e., division by zero) during interpolation. Most rasterization standards (i.e., OpenGL®) do not require the generation of fragments with clip-space "w" values less than or equal to zero.

Thus, the present scheme performs depth testing with a "window-space Z" depth buffer which makes it compatible with existing programming interfaces such as OpenGL® and Direct3D® which assume a "window-space Z" depth buffer. Further, depth values are clamped to their minimum and maximum generatable values as determined by the current depth range state. It is this clamping that allows the present scheme of ignoring clipping to the near and far planes compatible with conventional "window-space Z" depth buffering.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
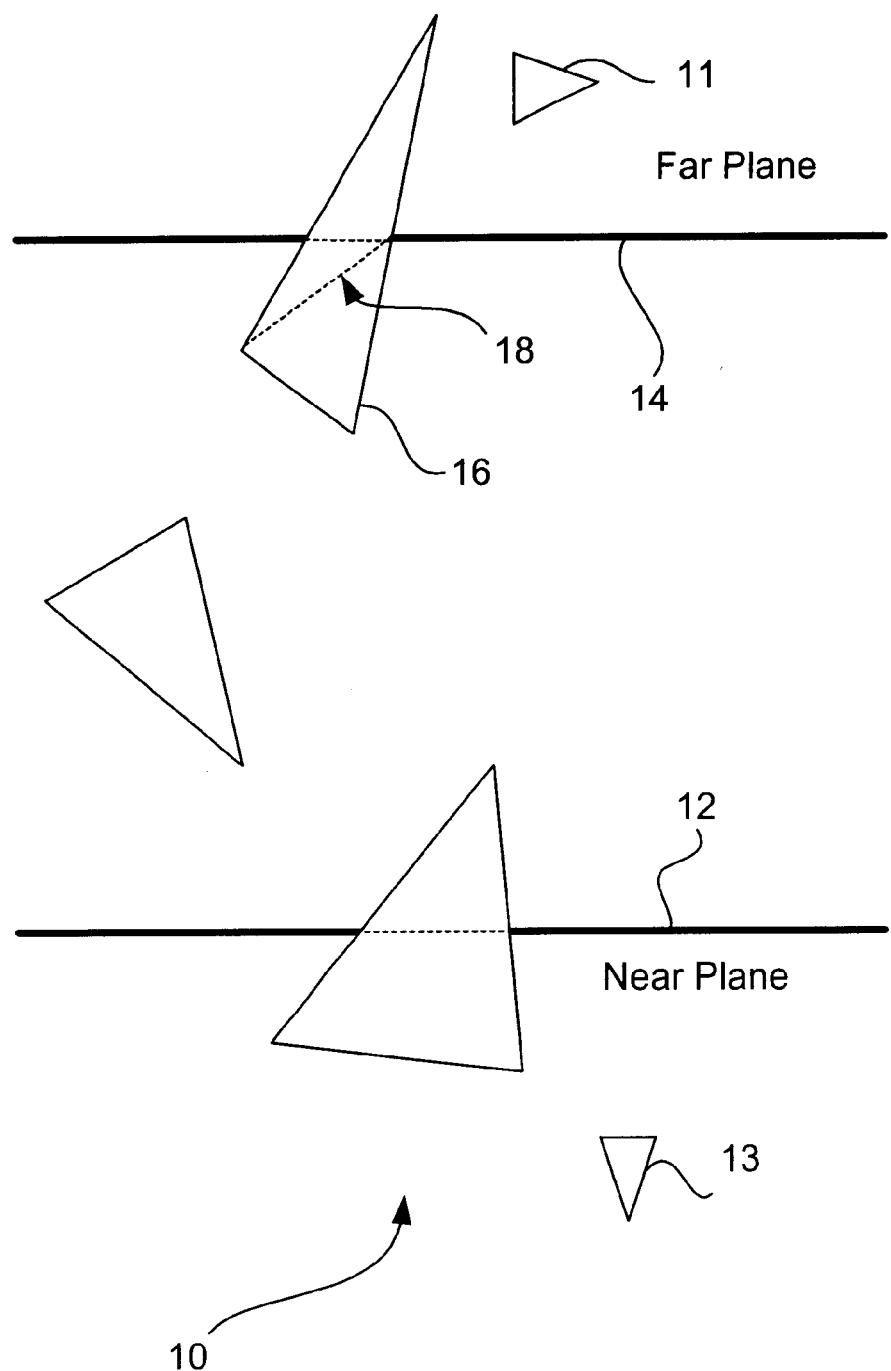
FIG. 1 illustrates the prior art.
Figure 1A:
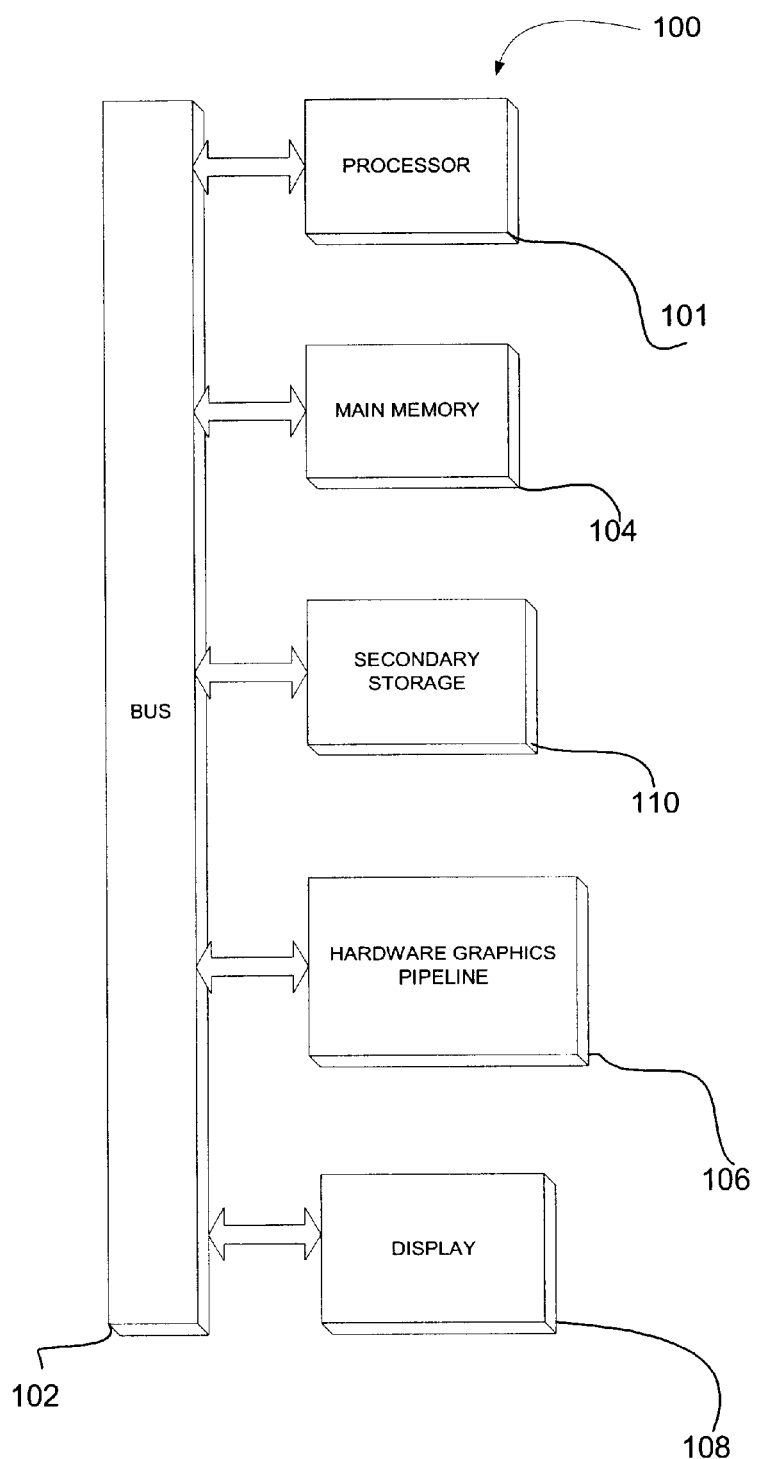
FIG. 1A is a block diagram of a digital processing system embodying the method and apparatus, in accordance with one embodiment.

FIG. 1 illustrates the prior art. FIG. 1A is a block diagram of a digital processing system embodying the method and apparatus, in accordance with one embodiment. With reference to FIG. 1A, a computer graphics system is provided that may be implemented using a computer 100. The computer 100 includes one or more processors, such as processor 101, which is connected to a communication bus 102. The bus 102 can be implemented with one or more integrated circuits, and perform some logic functions; for example, a typical personal computer includes chips known as north bridge and south bridge chips. The computer 100 also includes a main memory 104. Control logic (software) and data are stored in the main memory 104 which may take the form of random access memory (RAM). The computer also includes a hardware graphics pipeline 106 and a display 108, i.e. a computer monitor.

The computer 100 may also include a secondary storage 110. The secondary storage 110 includes, for example, a hard disk drive and/or a removable storage drive, representing a floppy disk drive, a magnetic tape drive, a compact disk drive, etc. The removable storage drive reads from and/or writes to a removable storage unit in a well known manner. Computer programs, or computer control logic algorithms, are stored in the main memory 104 and/or the secondary storage 110. Such computer programs, when executed, enable the computer 100 to perform various functions. Memory 104 and storage 110 are thus examples of computer-readable media.

In one embodiment, the techniques to be set forth are performed by the hardware graphics pipeline 106 which may take the form of hardware. Such hardware implementation may include a microcontroller or any other type of custom or application specific integrated circuit (ASIC). In yet another embodiment, the method of the present invention may be carried out in part on the processor 101 by way of a computer program stored in the main memory 104 and/or the secondary storage 110 of the computer 100. One exemplary architecture for the hardware graphics pipeline 106 will be set forth during reference to FIG. 1B.

Figure 1B:
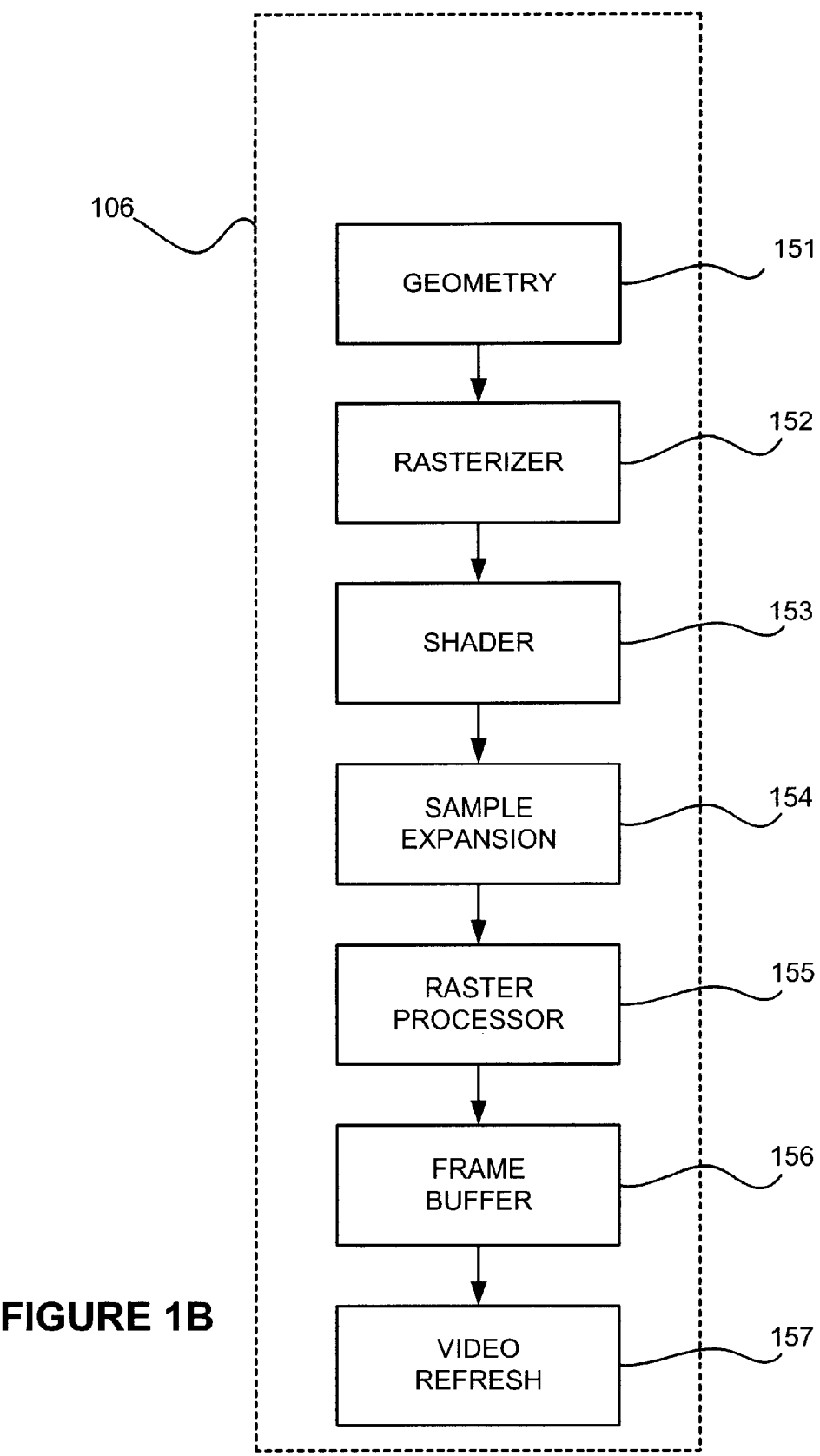
FIG. 1B illustrates a more detailed diagram showing the internal structure of one exemplary embodiment of the hardware graphics pipeline of FIG. 1A.

FIG. 1B illustrates a more detailed diagram showing the internal structure of one exemplary embodiment of the hardware graphics pipeline 106 of FIG. 1A. As shown, a geometry stage 151 is provided which transforms primitives into a screen-aligned coordinate system. Other computations may be performed by the geometry stage 201 such as lighting to determine the visual properties (e.g., color, surface normal, texture coordinates) of each vertex describing the primitives.

The transformed vertices form the input for a rasterizer 152. The rasterizer 152 computes a fragment for each pixel covered by each of the primitives. A coverage mask stored with the fragment indicates which portions of the pixel the fragment covers.

Also included is a shader 153 that computes the final fragment, e.g. by applying texture maps or shader programs to the fragment. A sample expansion stage 154 then generates multiple samples for each fragment.

Figure 1C:
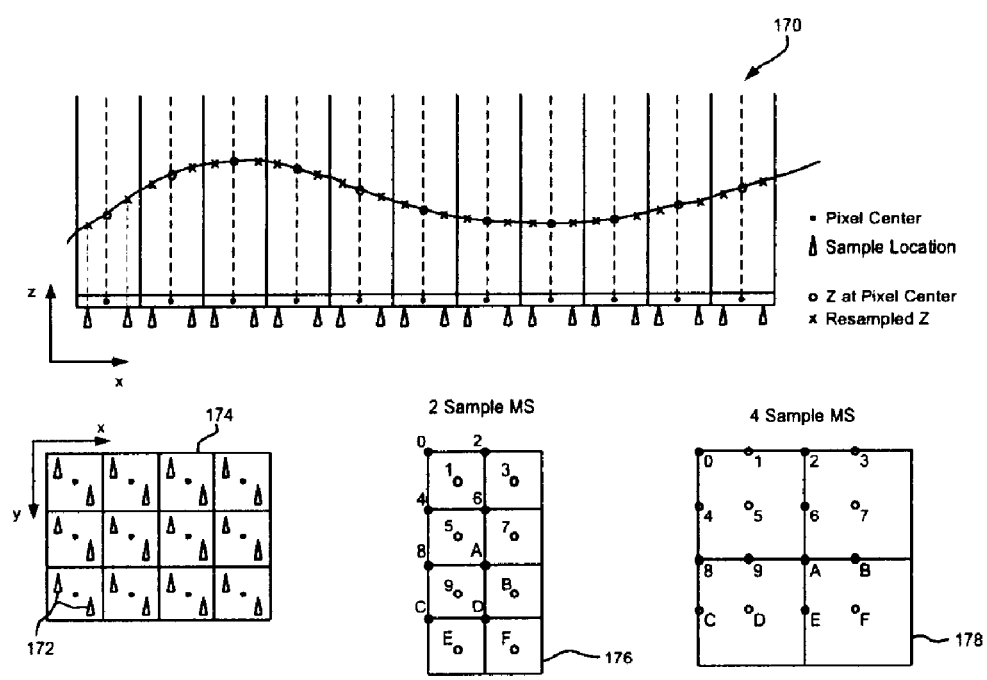
FIG. 1C illustrates the effect of multi-sampling, as carried out by the sample expansion module of FIG. 1B.

FIG. 1C illustrates the effect 170 of multi-sampling, as carried out by the sampling stage 154 of FIG. 1B. It should be noted that the multi-sampling may take place in any other component of the hardware graphics pipeline 106. The process of multi-sampling adjusts the fragment depth value to a sampling location in the pixel. All samples within a fragment carry the same color. As shown, sample locations 172 may be jittered, rotated, or skewed within a pixel 174. Of course, these options may be varied per the desires of the user (e.g. the system designer or subsystem designer). In one embodiment, either 2-sample multi-sampling 176, 4-sample multi-sampling 178, or any other #-multi-sampling may be employed per the desires of the user.

With reference again to FIG. 1B, after multi-sampling, the individual samples are sent to a raster-processor (ROP) 155 as if they were regular fragments. The raster-processor 155 performs various operations on the fragments, including z/stencil testing and color or alpha blending. This may require the raster-processor 155 to read a frame buffer memory 156 in order to retrieve the destination Z or the destination color. To this end, the final pixel color and Z are written back to the frame buffer memory 156.

When all primitives in the scene have been rendered in this manner, the contents of the frame buffer memory 156 are scanned out by a video refresh unit 157 and sent to the display 108.

In one embodiment, all of the foregoing components of the graphics system 106 except the frame buffer memory 156 (and possibly other memories, such as texture memory) may be situated on a single semiconductor platform. Of course, the various modules may also be situated separately or in various combinations of semiconductor platforms per the desires of the user. In the present description, a single semiconductor platform may refer to a sole unitary semiconductor-based integrated circuit or chip. It should be noted that the term single semiconductor platform may also refer to multi-chip modules with increased connectivity which simulate entirely on-chip operation, and make substantial improvements over utilizing a conventional CPU and bus implementation.

An interface may be used in conjunction with the various components set forth in FIGS. 1A and 1B. In one embodiment, such interface may include at least in part the Open Graphics Library (OpenGL®), Direct3D™ application program interfaces (APIs), a proprietary application program interface, or the like. OpenGL® is the computer industry's standard application program interface (API) for defining 2-D and 3-D graphic images. With OpenGL®, an application can create the same effects in any operating system using any OpenGL®-adhering graphics adapter (assuming support in the adapter for the same version of OpenGL® and support for the same OpenGL® extensions). OpenGL® specifies a set of commands or immediately executed functions. Each command directs a drawing action or causes special effects. OpenGL® and Direct3D™ APIs are commonly known to those of ordinary skill, and more information on the same may be found by reference to the OpenGL® Specification Version 1.2.1 which is incorporated herein by reference in its entirety. More information regarding one exemplary application program interface in the context of the present invention will be set forth hereinafter in greater detail.

Figure 1D:
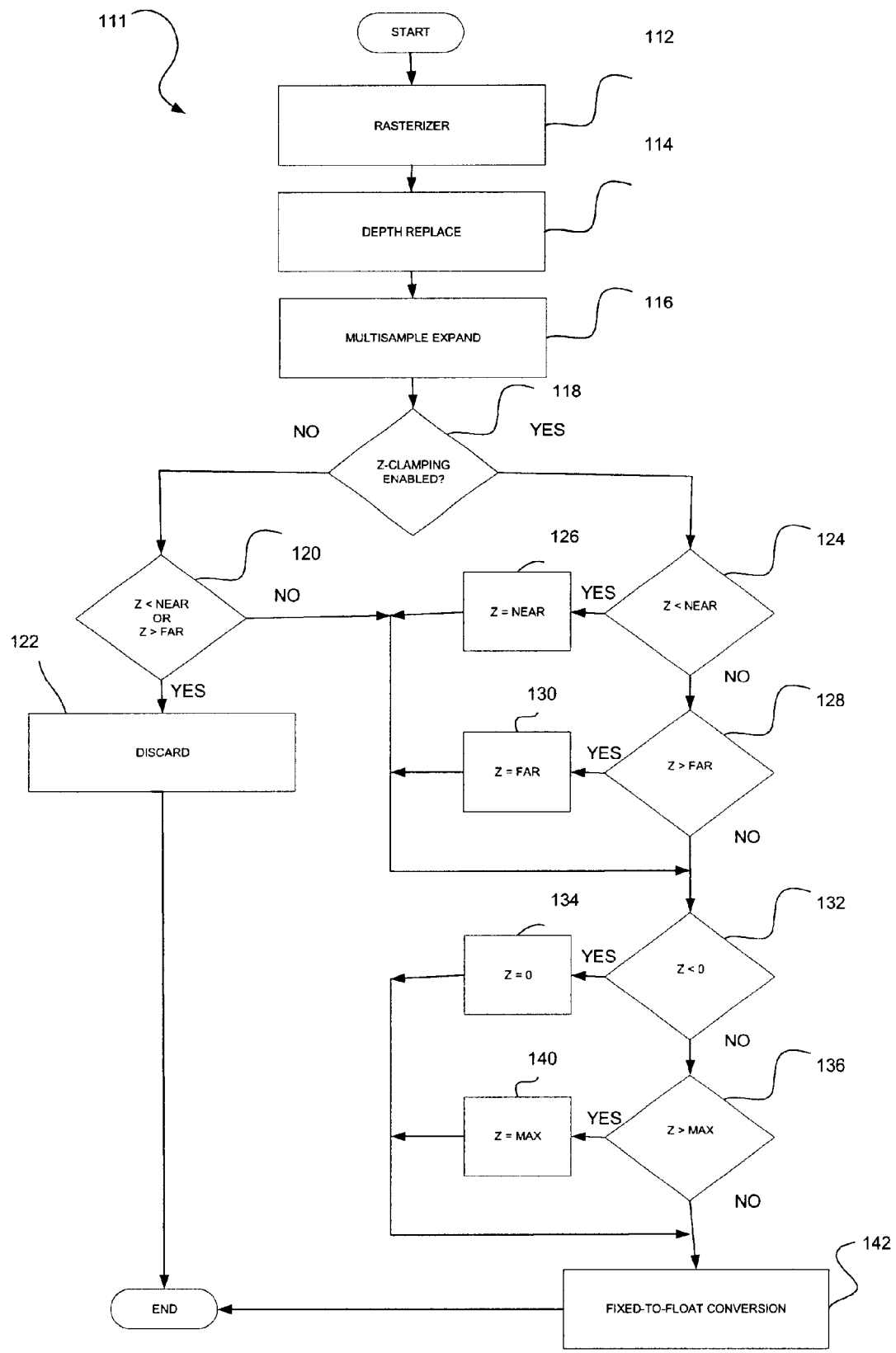
FIG. 1D illustrates a method for depth clamping in a hardware graphics pipeline, in accordance with one embodiment.

FIG. 1D illustrates a method 111 for depth clamping in a hardware graphics pipeline. It should be noted that the present method 111 may be carried out as an extension to an application program interface in the context of the above architecture. Of course, the present techniques may be carried out in any desired context.

Initially, in operation 112, a fragment is received from a rasterizer associated with a hardware graphics pipeline such as that shown in FIG. 1B. Next, a depth replace operation can be performed (this is optional in the pipeline) on the fragment in operation 114. In particular, depth replace 114 can substitute the depth value of a fragment with a value derived from a texture map. As an alternative, depth replace can add an offset (either positive or negative) to the depth value of the fragment, the offset being derived from a texture map.

The fragment is then expanded utilizing multi-sampling in operation 116 (an optional addition to the pipeline). Such multi-sampling may be carried by a sample expansion module such as that set forth in FIG. 1B, in accordance with an algorithm such as that of FIG. 1C. As mentioned earlier, a plurality of depth values are estimated by adjusting a fragment depth value to a sampling location in the pixel. While present exemplary method 111 mentions the use of fragment depth values, a depth value, in the context of the present description, may refer to any value indicative of depth in relation to a primitive, a clipped portion of a primitive, a pixel, and/or a fragment. The following discussion of the exemplary method 111 assumes a single depth value, but a fragment can comprise a plurality of depth values. If a fragment has a plurality of depth values, each depth value can be treated separately.

It is then determined whether the hardware graphics pipeline is operating in a depth clamping mode utilizing a control object (e.g. a control bit in a control register). See operation 118. To accomplish this, a data structure may be stored in memory. Such data structure may include a control object for indicating whether the hardware graphics pipeline is operating in a depth clamping mode. As will soon become apparent, a depth value may be clamped within a predetermined range utilizing the hardware graphics pipeline, if the control object indicates that the hardware graphics pipeline is operating in the depth clamping mode.

In particular, if it is determined in decision 118 that the hardware graphics pipeline is operating in the depth clamping mode, a depth value comparison operation is performed. In particular, it is determined whether a depth value associated with a fragment is less than a near plane value associated with a near plane. See decision 124. If it is determined that the depth value is less than the near plane value, the depth value is clamped to the near plane value in operation 126. If it is determined in decision 128 that the depth value is greater than a far plane value associated with a far plane, the depth value may be clamped to the far plane value. See operation 130.

If, however, the hardware graphics pipeline is not operating in the depth clamping mode (see again decision 118), a clipping operation is performed. As an option, such clipping may be performed using the a raster operation (ROP) module of the hardware graphics pipeline. Note, for example, ROP 155 of FIG. 1B.

Specifically, during the clipping operation, it is determined whether the depth value is less than the near plane value associated with the near plane or whether the depth value is greater than the far plane value associated with the far plane. Note decision 120. Next, in operation 122, the fragment is discarded if it is determined that the depth value is less than the near plane value associated with the near plane or the depth value is greater than the far plane value associated with the far plane, after which the process is terminated.

The present technique thus provides a hardware mechanism, where pixel coverage is determined either with (i.e., conventional clipping operation) or without consideration of the near and far clip planes (i.e., a "depth clamping" operation).

Strictly as an option, a range clamp operation is performed which includes a plurality of operations. In particular, it is determined in decision 132 whether the depth value is less than zero (0). Further, the depth value is clamped to zero if it is determined that the depth value is less than zero. See operation 134. It is then determined whether the depth value is greater than a maximum value associated with the hardware graphics pipeline. See decision 136. In other words, it is determined whether the buffer constraints, etc. of the hardware graphics pipeline preclude the use of the depth value, due to its size. If it is determined that the depth value is greater than the maximum value associated with the hardware graphics pipeline, the depth value is clamped to the maximum value in operation 140.

Such second clamping may be important for ensuring that the depth values are in an acceptable range. This may avoid both rendering fragments that are logically "behind" the viewer and numerically unstable operations (i.e., division by zero) during interpolation. It should be noted that most rasterization standards (i.e., OpenGL®) do not require the generation of fragments with clip-space "w" values less than or equal to zero.

Further, the depth value is converted from a first representation to a second representation. See operation 142. Optionally, the first representation may be a fixed-point representation and the second representation may be a floating-point representation. In such case, the floating-point representation may be 16-bit floating point, 24-bit floating point, etc. In the alternative, the first representation may be a floating-point representation and the second representation may be a fixed-point representation.

In an alternate embodiment where depth values of primitive are involved, a graphics primitive may be split into a plurality of portions in the clipping process (see the OpenGL® specification) within the pipeline. If the hardware graphics pipeline is operating in the depth clamping mode, the polygon clipping process (which can be done in a geometry stage 151) does not perform its normal clipping (normal clipping simply clips away the portions of the polygon that are outside the view frustum). Rather, the polygon clipping process clips away the portions of the polygon that are outside the x and y extents of the view frustum, but forms new polygons for the portions of the polygons that are outside of the z extent of the view frustum. These new polygons have the same x and y extents as the corresponding clipped away portions of the original polygon. These new polygons are located on (or close to) the front and/or rear clipping plane. Hence, at least one of the new polygons has all depth values clamped to a predetermined value utilizing the hardware graphics pipeline.

Figure 1E:
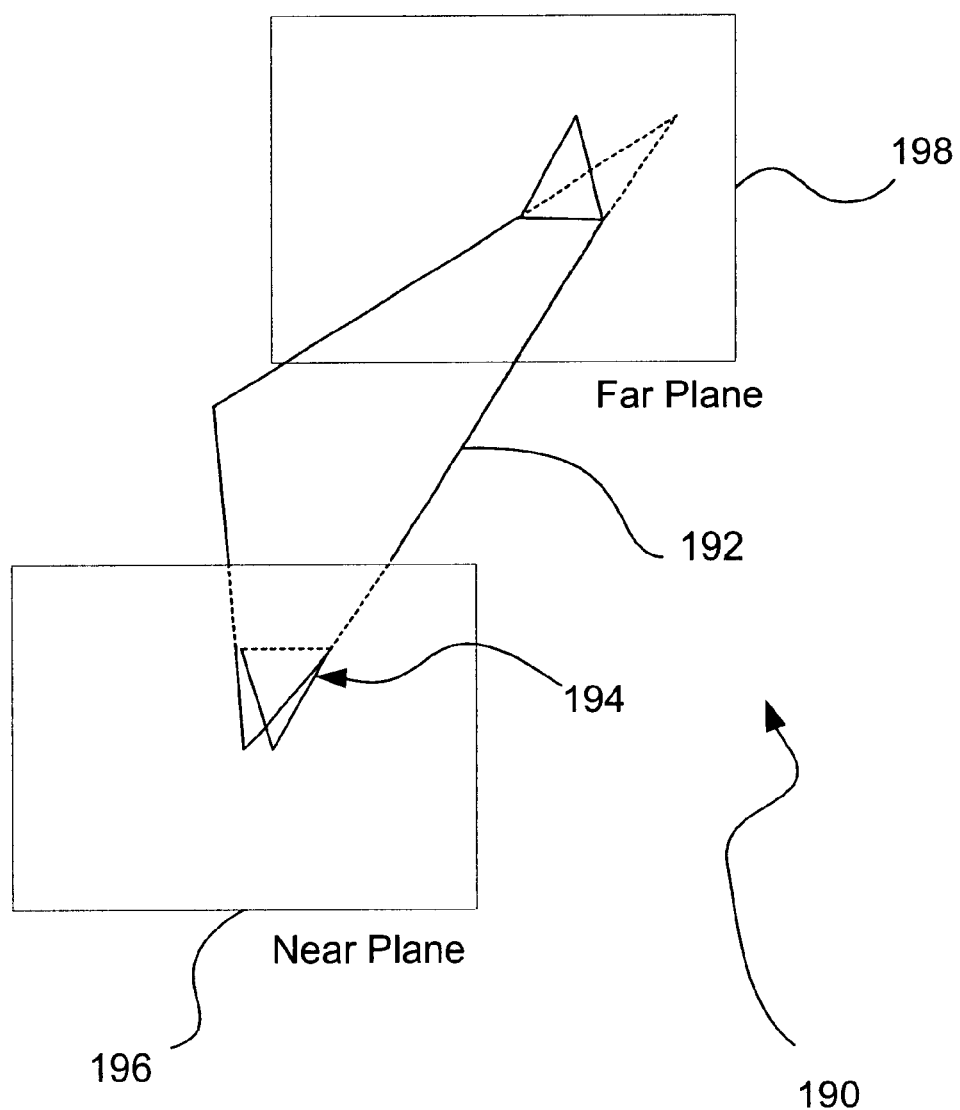
FIG. 1E illustrates the result of the method of FIG. 1D, in accordance with one embodiment.

FIG. 1E illustrates the result of the method, in accordance with one embodiment that operates on depth values of primitives. As shown, portions 194 of a primitive 192 are projected or "clamped" onto near and far planes (196, 198) in the hardware graphics pipeline. Essentially, this is accomplished by determining whether a hardware graphics pipeline is operating in a predetermined mode. If the hardware graphics pipeline is operating in the predetermined mode, the primitive 192 is projected to at least one of a near plane and a far plane (196, 198) utilizing the hardware graphics pipeline.

Figure 2:
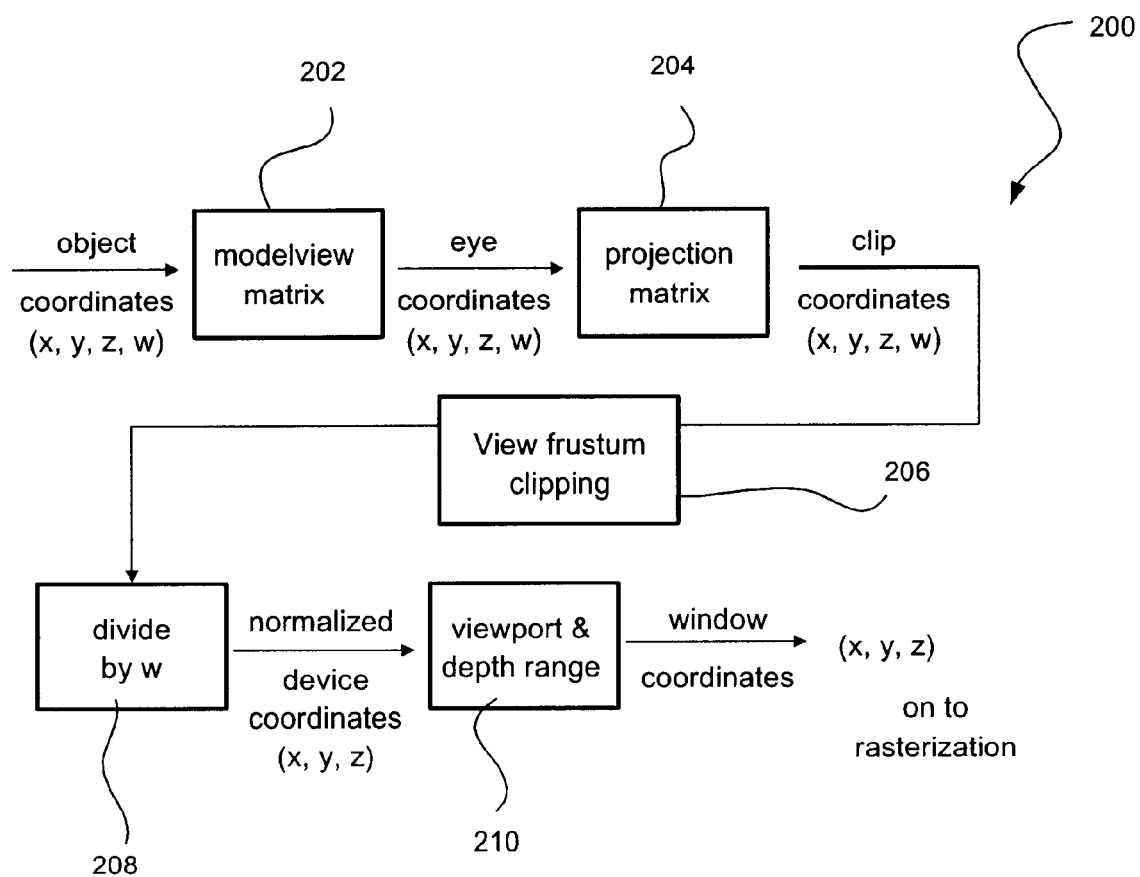
FIG. 2 illustrates a method for transforming vertices from object-space to window-space including view frustum culling.

FIG. 2 illustrates a method 200 for vertex transformation and view frustum culling. Initially, object coordinates are received in operation 202 for being transformed utilizing a model view matrix to generate eye coordinates. See operation 202. Next, in operation 204, the eye coordinates are transformed utilizing a projection matrix to generate clip coordinates.

Next, a view frustum clipping operation 206 is performed on the clip coordinates. More information regarding such operation 206 will be set forth in greater detail during reference to FIG. 3.

The clip coordinates are then divided by a w-value to generate normalized device coordinates, as indicated in operation 208. Further, in operation 210, the normalized device coordinates are transformed utilizing viewport and depth range transformations to generate window coordinates.

The method 200 then proceeds to rasterization. The specific manner in which such rasterization is carried out depends on whether the hardware graphics pipeline is operating in the depth clamping mode, and will be set forth in greater detail during reference to FIGS. 4 and 5.

Figure 3:
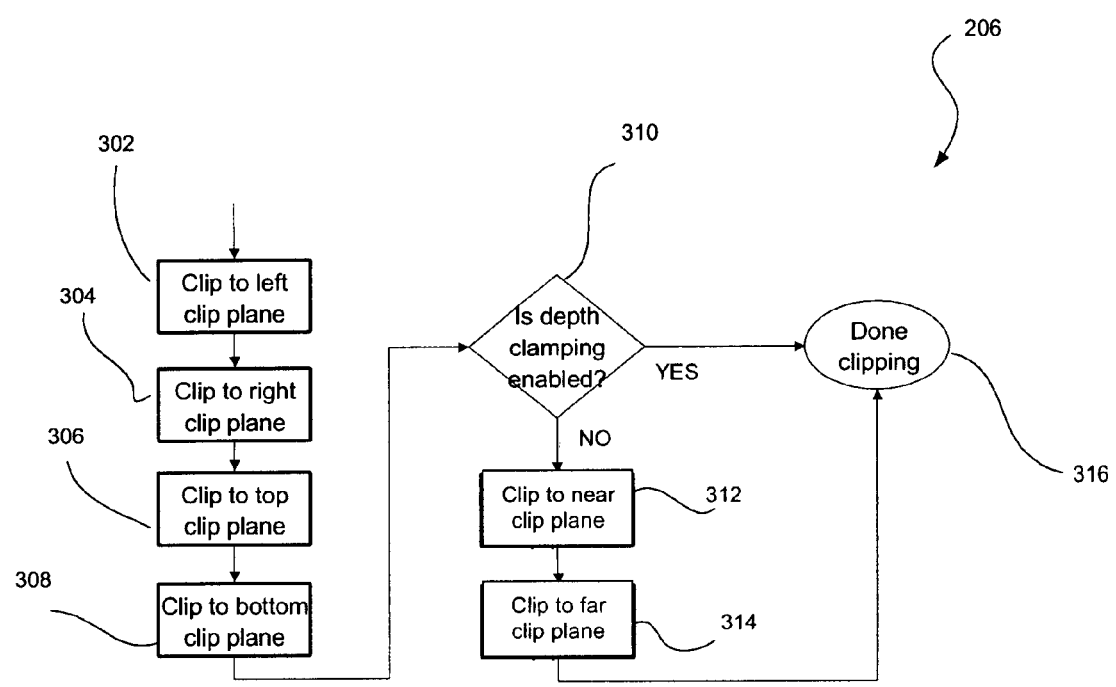
FIG. 3 illustrates a method for view frustum clipping when depth clamping is either enabled or disabled, in accordance with operation 206 of FIG. 2.

FIG. 3 illustrates a method for view frustum clipping, in accordance with operation 206 of FIG. 2. While one specific method is shown, it should be noted that a desired view frustum clipping operation may be performed per the desires of the user. View frustum clipping can also include user-specified (or application-defined) clip planes.

As shown, the clip coordinates are clipped based on a left clip plane in operation 302. Further, the clip coordinates are clipped based on a right clip plane, in operation 304. The clip coordinates are further clipped based on a top clip plane and a bottom clip plane, as indicated in operations 306 and 308, respectively.

It is then determined in decision 310 as to whether the hardware graphics pipeline is operating in a depth clamping mode. Again, this may be accomplished utilizing any desired technique such as the utilization of a control bit. If the hardware graphics pipeline is not operating in the depth clamping mode, the clip coordinates are clipped based on a near clip plane and a far clip plane in operations 312 and 314, respectively. Operation 316 is when clipping is done and vertices for clipped primitives are generated. Thus, the present view frustum clipping method sends primitives down the pipeline that have portions outside the view frustum.

Figure 3A:
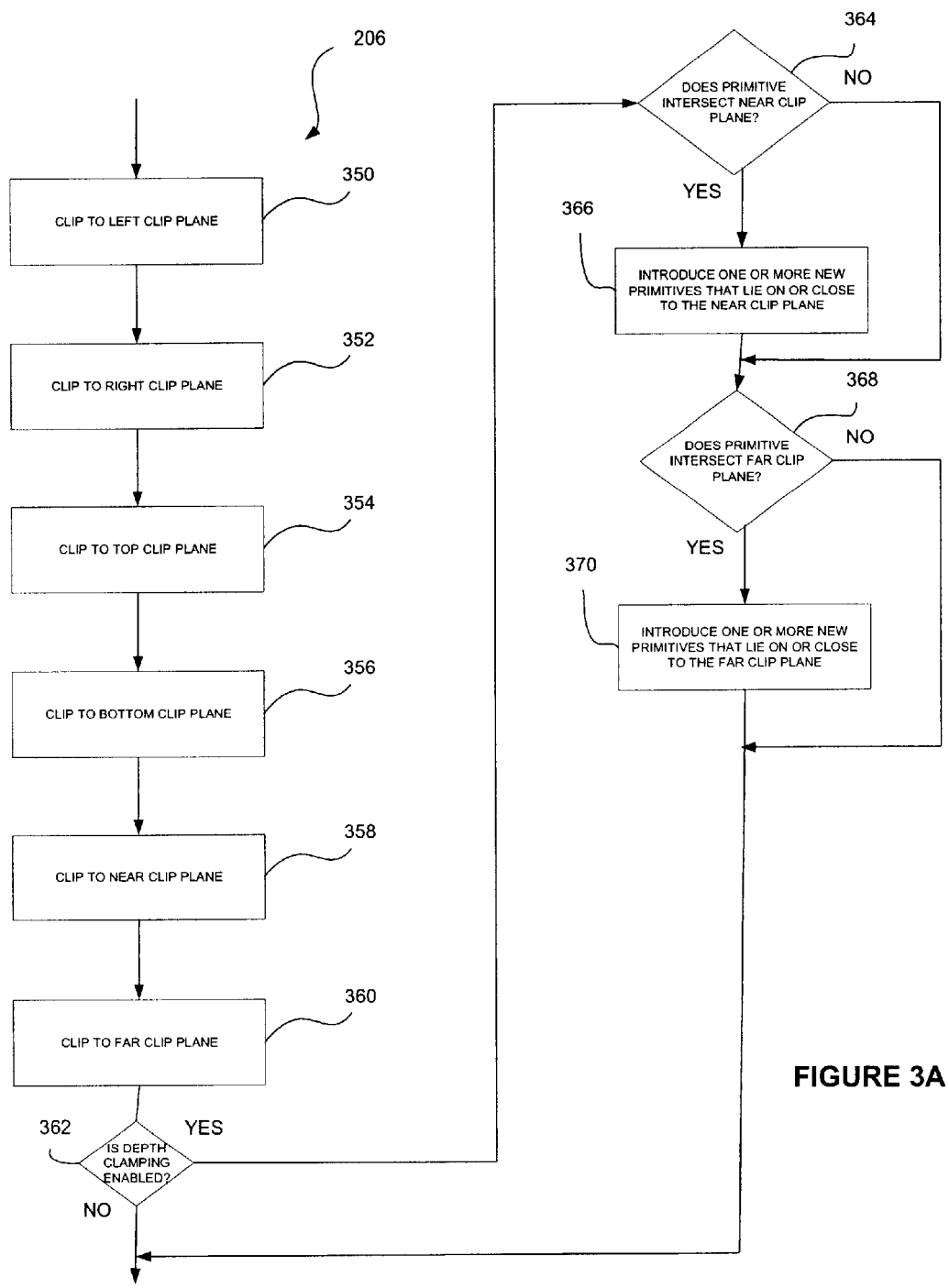
FIG. 3A illustrates another alternate method for view frustum clipping, in accordance with operation 206 of FIG. 2.

FIG. 3A illustrates another alternate method for view frustum clipping, in accordance with operation 206 of FIG. 2. Similar to the previous method, the clip coordinates are clipped based on a left clip plane in operation 350. Further, the clip coordinates are clipped based on a right clip plane in operation 352. The clip coordinates are further clipped based on a top clip plane and a bottom clip plane, as indicated in operations 354 and 356, respectively.

During the present method, the clip coordinates are clipped based on a near clip plane and a far clip plane in operations 358 and 360, respectively. It is then, after all of these clipping operations, that it is determined in decision 362 as to whether the hardware graphics pipeline is operating in a depth clamping mode. If the hardware graphics pipeline is not operating in the depth clamping mode, the present view frustum clipping method is terminated.

If, however, it is determined that the hardware graphics pipeline is operating in the depth clamping mode, it is then determined in operation 364 as to whether a primitive intersects the near clip plane. If so, one or more new primitives are introduced that lie on or close to the near clip plane in operation 366.

In a similar manner, it is then determined in operation 368 as to whether a primitive intersects the far clip plane. If so, one or more new primitives are introduced that lie on or close to the far clip plane in operation 370. Thus, using this alternate view frustum clipping method ensures that downstream fragment processing will not have any fragments outside the view frustum.

The procedures that follow again depend on whether the hardware graphics pipeline is operating in the depth clamping mode. If it is determined that the hardware graphics pipeline is not operating in the depth clamping mode, the method 200 of FIG. 2 proceeds in accordance with FIG. 4. If, however, it is determined that the hardware graphics pipeline is operating in the depth clamping mode, the method 200 of FIG. 2 proceeds in accordance with FIG. 5.

Figure 4:
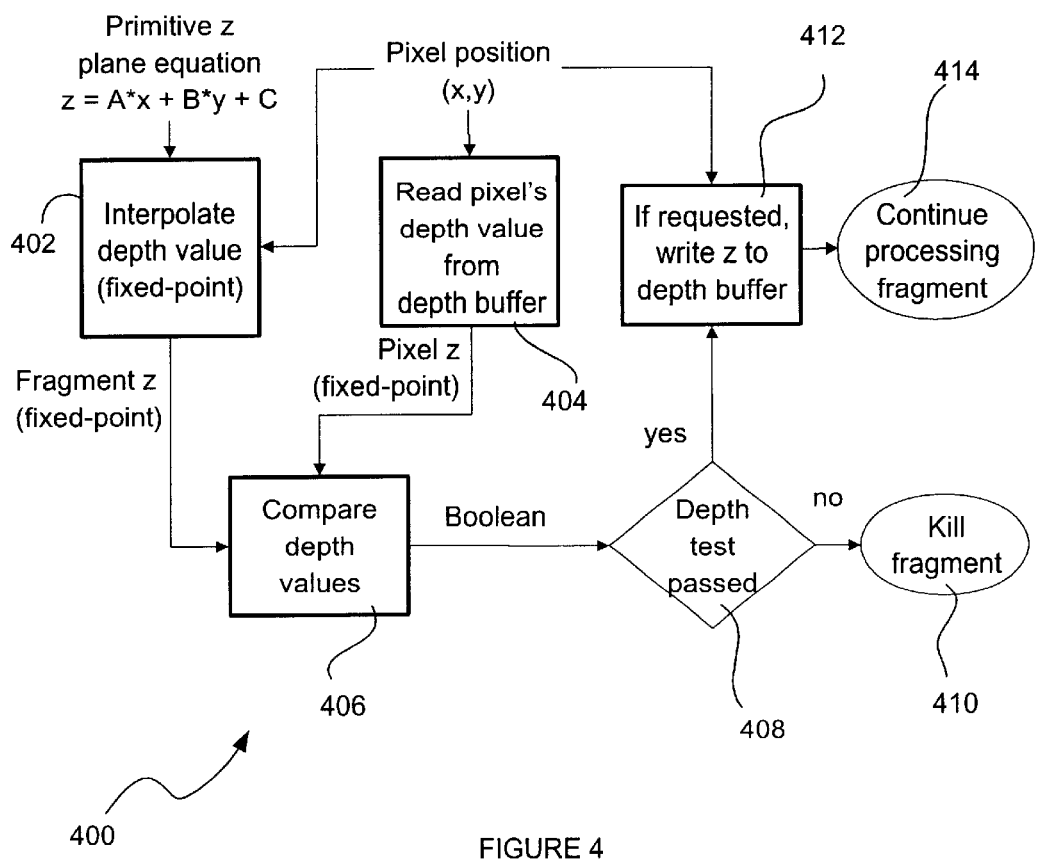
FIG. 4 illustrates a rasterization method that follows the operations set forth in FIG. 2, if the hardware graphics pipeline is not operating in a depth clamping mode.

FIG. 4 illustrates a rasterization method 400 that follows the operations set forth in FIG. 2, if the hardware graphics pipeline is not operating in the depth clamping mode. As shown, in operation 402, the fragment depth value associated with the fragment is interpolated utilizing the window coordinates in the fixed-point representation. Next, in operation 404, the pixel depth value is read in the fixed-point representation from the depth buffer. Many of these operations, and those described later, can occur in parallel, and represent a preferred mode due to enhanced performance.

Next, in operation 406, a test is conducted involving the comparison of the fragment depth value and the pixel depth value. At this point, it is determined whether the fragment depth value passed the test. See decision 408.

If it is determined that the fragment depth value did not pass the test, the fragment is discarded in operation 410. It is then determined whether a request has been made to write the fragment depth value to the depth buffer. See decision 412. The fragment depth value is then written to the depth buffer if the request has been made, after which fragment processing progresses. See operation 414.

Figure 5:
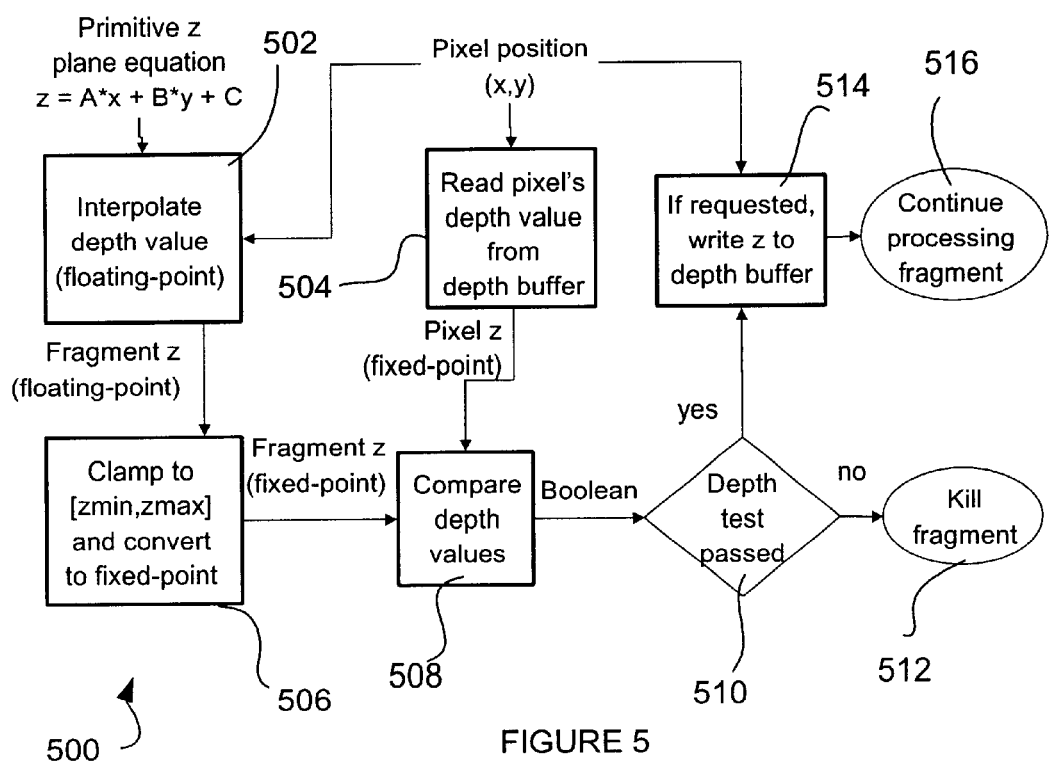
FIG. 5 illustrates a rasterization method that follows the operations set forth in FIG. 2, if the hardware graphics pipeline is indeed operating in a depth clamping mode.

FIG. 5 illustrates a rasterization method 500 that follows the operations set forth in FIG. 2, if the hardware graphics pipeline is indeed operating in the depth clamping mode. As shown, in operation 502, the fragment depth value associated with the fragment is interpolated utilizing the window coordinates, the result preferably being in the floating-point representation. Next, in operation 504, the pixel depth value is read in the fixed-point representation from the depth buffer.

In operation 506, the fragment depth value is clamped within a predetermined range defined by a programmable near plane and far plane. The fragment may be modified utilizing a raster operation (ROP) module of the hardware graphics pipeline. Note ROP 155 of FIG. 1B. Next, shown in the same operation 506, the fragment depth value is converted to a fixed-point representation.

Next, in operation 508, a test is conducted involving the comparison of the fragment depth value and the pixel depth value. At this point, it is determined whether the fragment depth value passed the test. See decision 510.

If it is determined that the fragment depth value did not pass the test, the fragment is discarded in operation 512. It is then determined whether a request has been made to write the fragment depth value to the depth buffer. See decision 514. The fragment depth value is then written to the depth buffer if the request has been made, after which fragment processing is continued. See operation 516. Such write operation may be carried out utilizing the same pixel position used for the interpolation and read operations 502 and 504, respectively.

Thus, when rasterized fragments are generated with interpolated depth values beyond the range of a fixed-point depth buffer numeric range (due to the possible lack of near and far plane clipping), out-of-range interpolated depth values are clamped to the current depth range setting, guaranteeing that post-clamping depth values are within the depth buffer representable range prior to depth testing. This depth clamping operation is carried out when clipping ignores the near and far clip planes. To handle the potentially unbounded range for interpolated depth values without near and far plane clipping, depth value interpolation may be performed with floating-point math, as set forth hereinabove. The depth clamping operation may be performed on a per-fragment basis. Alternatively, if floating point values are stored in the depth buffer, then operation 505 makes the format of two compared depth values the same.

Additionally, rasterized fragments with clip-space "w" values (usually understood to encode the eye-space distance from the viewer) that are less than or equal to zero may be discarded. This may avoid both rendering fragments that are logically "behind" the viewer and numerically unstable operations (i.e., division by zero) during interpolation. Most rasterization standards (i.e., OpenGL®) do not require the generation of fragments with clip-space "w" values less than or equal to zero.

The present scheme performs depth testing with a "window-space Z" depth buffer which makes it compatible with existing programming interfaces such as OpenGL® and Direct3D® which assume a "window-space Z" depth buffer. Further, depth values are clamped to their minimum and maximum generatable values as determined by the current depth range state. It is this clamping that allows the present scheme of ignoring clipping to the near and far planes compatible with conventional "window-space Z" depth buffering.

Embodiments for Application Program Interfaces

The following description is set forth in the context of OpenGL® which is commonly known to those of ordinary skill. More particularly, the following information is set forth in the context of the OpenGL® Specification Version 1.2.1, which is incorporated herein by reference in its entirety. It should be noted that, in the present description, OpenGL® API commands and tokens are prefixed by "gl" and "GL__," respectively. Also, OpenGL® extension commands and tokens are, by convention, often suffixed by letters indicating the company that proposed the extension, for example, "NV" or "__NV," respectively. When the context is clear, such prefixes and suffices are dropped for brevity and clarity.

The present extension provides functionality that is useful to obviate the need for near or far plane capping of stenciled shadow volumes. The functionality may also be useful for rendering geometry "beyond" the far plane if an alternative algorithm (rather than depth testing) for hidden surface removal is applied to such geometry (specifically, the painter's algorithm). Similar situations at the near clip plane can be avoided at the near clip plane where apparently solid objects can be "seen through" if they intersect the near clip plane.

Another way to specify this functionality is to describe it in terms of generating the equivalent capping geometry that would need to be drawn at the near or far clip plane to have the same effect as not clipping to the near and far clip planes and clamping interpolated depth values outside the window-space depth range. However, describing the functionality as capping is fairly involved. Eliminating far and near plane clipping and clamping interpolated depth values to the depth range is much simpler to specify.

Options

Various options will now be set forth which may or may not be implemented in the context of the present exemplary extension.

Depth clamping affects all geometric primitives. In the case of points, if one renders a point "in front of" the near clip plane, it should be rendered with the $z_w$ value min(n,f), where n and f are the near and far depth range values if depth clamping is enabled. Similarly, a point "behind" the far clip plane may be rendered with the $z_w$ value max(n,f). The setting of the raster position function may vary when depth clamping is enabled. For example, when setting the raster position, the raster position $z_w$ may be clamped to the range [min(n,f),max(n,f)], where n and f are the near and far depth range values.

This rule ensures that the raster position $z_w$ may not be outside the [0,1] range (because n and far are clamped to the [0,1] range). The raster position is specified to be updated this way because otherwise a raster position $z_w$ could be specified outside the [0,1] range when depth clamping is enabled, but then if depth clamping is subsequently disabled, that out-of-range raster position $z_w$ could not be written to the depth buffer.

This semantic can make for some unexpected semantics that are described herein. For example, depth clamping may be enabled and the raster position may be set to point behind the far clip plane such that the pre-clamped $z_w$ is 2.5. Because depth clamping is enabled, the raster position $z_w$ is clamped to the current near and far depth range values. If these values are 0.1 and 0.9, 2.5 is clamped to 0.9.

On the other hand, a bitmap (or image rectangle) may be rendered with depth testing enabled under various situations. If depth clamping remains enabled and the depth range is unchanged, the bitmap fragments are generated with a $z_w$ of 0.9.

However, if depth range is subsequently set to 0.2 and 0.8 and depth clamping is enabled, the bitmap fragments may have the $z_w$ depth component clamped to 0.8. However, if the depth range is changed to 0.2 and 0.8 but depth range clamped is disabled, the bitmap fragments may have a $z_w$ depth component of 0.9 since the depth clamping is then not applied.

Various push/pop attrib bits may affect the depth clamp enable. For example, GL__ENABLE__BIT and GL__TRANSFORM__BIT may be used. Further, depth clamping may interact with depth replace operations (i.e. from NV__texture__shader) in various ways. The depth clamp operation occurs as part of the depth test so depth clamping occurs after any depth replace operation in the pipeline. A depth replace operation can reassign the fragment $z_w$, but depth clamping if enabled will subsequently clamp this new $z_w$.

Depth clamping does not necessarily affect read/draw/copy pixels operations involving depth component pixels. Further, depth clamping may occur after polygon offset. For example, depth clamping may occur immediately before the depth test.

Further, fragments with $w_c<=0$ may not necessarily be generated when the present extension is supported. The core OpenGL specification (i.e. section 2.11 of the OpenGL® 1.2.1 Specification) is worded to allow the possibility of generating fragments where $w_c<=0$. In some cases, these should not be generated when the present extension is supported.

Table #1A illustrates exemplary tokens associated with the present extension.

TABLE #1A

Accepted by the <cap> parameter of Enable, Disable, and IsEnabled, and by the <pname> parameter of GetBooleanv, GetIntegerv, GetFloatv, and GetDoublev:
DEPTH__CLAMP__NV     0x864F Additional information will now be set forth in a topic-by-topic format. This information is meant to expand upon what is commonly known to those of ordinary skill, as exemplified by Chapter 2 of the OpenGL® 1.2.1 Specification (OpenGL® Operation).

Clipping

Depth clamping is enabled with the generic Enable command and disabled with the Disable command. The value of the argument to either command is DEPTH__CLAMP__NV. If depth clamping is enabled, the "$-w_c<=z_c<=w_c$" plane equation are ignored by video volume clipping (effectively, there is no near or far plane clipping).

It should be noted that only $w_c>0$ fragments may be generated rather than even allowing the possibility that $w_c<=0$ fragments may be generated.

A line segment or polygon whose vertices have $w_c$ values of differing signs may generate multiple connected components after clipping. GL implementations are not required to handle this situation. That is, only the portion of the primitive that lies in the region of $w_c>0$ should be produced by clipping.

More information on this topic that is well known to those of ordinary skill may be found in section 2.11 of the OpenGL® 1.2.1 Specification.

Current Raster Position

If depth clamping (see the foregoing section and section 2.11 of the OpenGL® 1.2.1 Specification) is enabled, then raster position $z_w$ is first clamped as follows. If the raster position $w_c > 0$, then $z_w$ is clamped in the range [min(n,f), max(n,f)] where n and f are the current near and far depth range values (see section 2.10.1 of the OpenGL® 1.2.1 Specification).

More information on this topic that is well known to those of ordinary skill may be found in section 2.12 of the OpenGL® 1.2.1 Specification.

Depth Buffer Test

If depth clamping (see the foregoing section and section 2.11 of the OpenGL® 1.2.1 Specification) is enabled, before the incoming fragment $z_w$ is compared, $z_w$ is first clamped as follows: If the fragment $w_c > 0$, then $z_w$ is clamped to the range [min(n,f),max(n,f)] where n and f are the current near and far depth range values (see section 2.10.1 of the OpenGL® 1.2.1 Specification).

More information on this topic that is well known to those of ordinary skill may be found in section 4.1.5 of the OpenGL® 1.2.1 Specification.

Table #1B illustrates a new state.

TABLE #1B

| Get Value | Type | Get Command | Initial Value | Description | Sec | Attribute |
|---|---|---|---|---|---|---|
| DEPTH_CLAMP_NV | B | IsEnabled | False | Depth clamping on/off | 2.10.2 | transform/enable |

Shadow Volumes Embodiment

As an option, the depth value may be clamped in the foregoing manner in the context of shadow volume rendering. More information will now be said regarding this option.

Shadow volumes may be handled by combining (1) placing the conventional far clip plane "at infinity"; (2) rasterizing infinite (but fully closed) shadow volume polygons via homogeneous coordinates; and (3) adopting the zfail stencil-testing scheme. This is sufficient to render shadow volumes robustly because it avoids the problems created by the far clip plane "slicing open" the shadow volume. The shadow volumes constructed project "all the way to infinity" through the use of homogeneous coordinates to represent the infinite back projection of a shadow volume. Importantly, though the shadow volume geometry is infinite, it is also fully closed. The far clip plane, in eye-space, is infinitely far away so it is impossible for any of the shadow volume geometry to be clipped by it.

By using a zfail stencil-testing scheme, it can be assumed that infinity is "beyond" all closed shadow volumes if, in fact, the shadow volumes are closed off at infinity. This means the shadow depth count may start from zero for every pixel. One does not have to concern his or herself with the shadow volume being clipped by the near clip plane since shadow volume enters and exits are counted from infinity, rather than from the eye, due to zfail stencil-testing. Fragile capping is not necessarily required so the present algorithm is both robust and automatic.

The standard perspective formulation of the projection matrix used to transform eye-space coordinates to clip space in OpenGL® is shown in Table #1C.

TABLE 1C $$P = \begin{bmatrix} \frac{2n}{r-1} & 0 & \frac{r+1}{r-1} & 0 \\ 0 & \frac{2n}{t-b} & \frac{t+b}{t-b} & 0 \\ 0 & 0 & -\frac{f+n}{f-n} & -\frac{2fn}{f-n} \\ 0 & 0 & -1 & 0 \end{bmatrix}$$

where n and f are the respective distances from the viewer to the near and far clip planes in eye-space. P is used to transform eye-space positions to clip-space positions as set forth in Table #2.

TABLE 2

$$[x_c\ y_c\ z_c\ w_c]^T = P[x_e\ y_e\ z_e\ w_e]^T$$

There is interest in avoiding far plane clipping so there is only concern with the third and fourth row of P used to compute clip-space $z_c$ and $w_c$. Regions of an assembled polygon with interpolated clip coordinates outside $-w_c <= Z_c <= w_c$ are clipped by the near and far clip planes. The limit of P may be considered as the far clip plane distance driven to infinity. See Table #3.

TABLE 3

$$\lim_{f \to \infty} P = P_{inf} = \begin{bmatrix} \frac{2n}{r-1} & 0 & \frac{r+1}{r-1} & 0 \\ 0 & \frac{2n}{t-b} & \frac{t+b}{t-b} & 0 \\ 0 & 0 & -1 & -2n \\ 0 & 0 & -1 & 0 \end{bmatrix}$$

The first, second, and fourth rows of Pinf are the same as P; only the third row changes. There is no longer an f distance. A vertex that is an infinite distance from the viewer is represented in homogeneous coordinates with a zero we coordinate. If the vertex is transformed into clip space using Pinf, assuming the vertex is in front of the eye, meaning that $z_e$ is negative (the OpenGL® convention), then $w_c = z_c$ so this transformed vertex is not clipped by the far plane. Moreover, its non-homogeneous depth $z_c/w_c$ is 1.0, generating the maximum possible depth value.

It may be surprising, but positioning the far clip plane at infinity typically reduces the depth buffer precision only marginally. Consider how much one would need to shrink the window coordinates so he or she can represent within the depth buffer an infinite eye-space distance in front of the viewer. The projection P transforms (0,0,−1,0) in eye-space (effectively, an infinite distance in front of the viewer) to the window-space depth f/(f−n). The largest window coordinate representable in the depth buffer is 1 so one may scale f/(f−n) by its reciprocal to "fit" infinity in the depth buffer. This scale factor is (f−n)/f and is very close to 1 if f is many times larger than n which is typical.

Said another way, using Pinf instead of P only compresses the depth buffer precision slightly in typical scenarios. For example, if n and f are 1 and 100, then the depth buffer precision must be squeezed by just 1% to represent an infinite distance in front of the viewer. It may be assumed that given a light source position and a closed model with its edge-connectivity, one can determine the subset of possible silhouette edges for the model. A possible silhouette edge is an edge shared by two triangles in a model where one of the two triangles faces a given light while the other triangle faces away from the light.

These edges are called "possible silhouette" edges rather than just silhouette edges because these edges are not necessarily boundaries between shadowed and illuminated regions as implied by the conventional meaning of silhouette. It is possible that an edge is an actual silhouette edge, but it is also possible that the edge is itself in a shadow.

Assume one has computed the plane equations in the form $Ax+By+Cz+Dw=0$ for every triangle in a given model. The plane equation coefficients may be computed using a vertex ordering consistent with the winding order shared by all the triangles in the model such that $Ax+By+Cz+Dw$ is non-negative when a point $(x,y,z,w)$ is on the front-facing side of the triangle plane.

Also assume one also knows the homogeneous position L of the light in the coordinate space matching the plane equations. For each triangle, $d=ALx+BLy+CLz+DLw$ may be evaluated for the triangle plane equation coefficients and the light position. If d is negative, the triangle is back-facing with respect to L; otherwise the triangle is front-facing with respect to L. Any edge shared by two triangles with one triangle front-facing and the other back-facing is a possible silhouette edge.

To close a shadow volume completely, three sets of polygons are combined: (1) all of the possible silhouette polygon edges extruded to infinity away from the light; (2) all of the occluder back-facing triangles, with respect to L, projected away from the light to infinity; and (3) all of the occluder front-facing triangles with respect to L.

Each possible silhouette edge has two vertices A and B (ordered based on the front-facing triangle vertex order) and represented as homogeneous coordinates. The shadow volume extrusion polygon for this possible silhouette is formed by the edge and its projection to infinity away from the light. The resulting quad consists of the following four vertices shown in Table #4.

TABLE #4

$<B_x, B_y, B_z, B_w>$
$<A_x, A_y, A_z, A_w>$
$<A_xL_w − L_xA_w, A_yL_w − L_yA_w, A_zL_w − L_zA_w, 0>$
$<B_xL_w − L_xB_w, B_yL_w − L_yB_w, B_zL_w − L_zB_w, 0>$

The last two vertices of Table #4 are the homogeneous vector differences of A−L and B−L. These vertices represent directions heading away from the light, explaining why they have w coordinate values of zero. When a perspective transform of the form Pinf is used, one can render shadow volume polygons without the possibility that the far plane will clip these polygons.

For each back-facing occluder triangle, the respective triangle projected to infinity is the triangle formed by the following three vertices shown in Table #5.

TABLE #5

$<A_xL_w − L_xA_w, A_yL_w − L_yA_w, A_zL_w − L_zA_w, 0>$
$<B_xL_w − L_xB_w, B_yL_w − L_yB_w, B_zL_w − L_zB_w, 0>$
$<C_xL_w − L_xC_w, C_yL_w − L_yC_w, C_zL_w − L_zC_w, 0>$ where A, B, and C are each back-facing occluder triangle three vertices (in the triangle vertex order). The front-facing polygons with respect to L are straightforward. Given three vertices A, B, and C of each triangle (in the triangle vertex order), the triangle is formed by the vertices. See Table #6.

TABLE #6

$<A_x, A_y, A_z, A_w>$
$<B_x, B_y, B_z, B_w>$
$<C_x, C_y, C_z, C_w>$

Together, these three sets of triangles form the closed geometry of an occluder shadow volume with respect to the given light.

The complete rendering procedure to render shadows will now be set forth. Pseudo-code with OpenGL® commands is provided below in Table #7 to make the procedure more concrete.

TABLE #7

1. Clear the depth buffer to 1.0; clear the color buffer.
   Clear(DEPTH_BUFFER_BIT | COLOR_BUFFER_BIT);
2. Load the projection with $P_{inf}$ given the aspect ratio, field of view, and near clip plane distance in eye-space.
   float Pinf[4][4];
   Pinf[1][0] = Pinf[2][0] = Pinf[3][0] = Pinf[0][1] =
   Pinf[2][0] = Pinf[3][1] = Pinf[0][2] = Pinf[1][2] =
   Pinf[0][3] = Pinf[1][3] = Pinf[3][3] = 0;
   Pinf[0][0] = cotangent (fieldOfView)/aspectRatio;
   Pinf[1][1] = cotangent(fieldOfView);
   Pinf[3][2] = −2*near; Pinf[2][2] = Pinf[2][3] = −1;
   MatrixMode(PROJECTION); LoadMatrixf(&Pinf[0][0]);
3. Load the modelview matrix with the scene's viewing transform.
   MatrixMode(MODELVIEW); loadCurrentViewTransform();
4. Render the scene with depth testing, back-face culling, and all light sources disabled (ambient & emissive illumination only).
   Enable(DEPTH_TEST); DepthFunc(LESS);
   Enable(CULL_FACE); CullFace(BACK);
   Enable(LIGHTING); Disable(LIGHT0);
   LightModelfv(LIGHT_MODEL_AMBIENT, &globalAmbient);
   drawScene();

TABLE #7-continued

5. Disable depth writes, enable additive blending, and set the global ambient light contribution to zero (and zero any emissive contribution if present).
   DepthMask(0);
   Enable(BLEND); BlendFunc(ONE,ONE);
   LightModelfv(LIGHT_MODEL_AMBIENT, &zero);
6. For each light source:
   A. Clear the stencil buffer to zero.
      Clear(STENCIL_BUFFER_BIT);
   B  Disable color buffer writes and enable stencil testing with the always stencil function and writing stencil.
      ColorMask(0, 0, 0, 0);
      Enable(STENCIL_TEST);
      StencilFunc(ALWAYS, 0, ~0); StencilMask(~0);
   C. For each occluder:
      a. Determine whether each triangle in the occluder's model is front- or back-facing with respect to the light's position. Update triList [].backfacing.
      b. Configure zfail stencil testing to increment stencil for back-facing polygons that fail the depth test.
         CullFace(FRONT); StencilOp(KEEP,INCR,KEEP);
      c. Render all possible silhouette edges as quads that project from the edge away from the light to infinity.

```
Vert L = currentLightPosition;
Begin(QUADS);
    for (int i=0; i<numTris; i++) // for each triangle
        // if triangle is front-facing with respect to the light
        if (triList[i].backFacing==0)
            for (int j=0; j<3; j++) // for each triangle edge
                // if adjacent triangle is back-facing
                // with respect to the light
                if (triList[triList[i].adjacent[j]].backFacing) {
                    // found possible silhouette edge
                    Vert A = triList[i].v[j];
                    Vert B = triList[i].v[(j+1) % 3]; // next vertex
                    Vertex4f(B.x,B.y,B.z,B.w);
                    Vertex4f(A.x,A.y,A.z,A.w);
                    Vertex4f(A.x*L.w-L.x*A.w,
                             A.y*L.w-L.x*A.w,
                             A.z*L.w-L.z*A.w, 0); // infinite
                    Vertex4f(B.x*L.w-L.x*B.w,
                             B.y*L.w-L.x*B.w,
                             B.z*L.w-L.z*B.w, 0); // infinite
                }
End(); // quads
```
      d. Specially render all occluder triangles. Project and render back facing triangles away from the light to infinity. Render front-facing triangles directly.

```
#define V triList[i].v[j] // macro used in Vertex4f calls
Begin(TRIANGLES);
    for (int i=0; i<numTris; i++) // for each triangle
        // if triangle is back-facing with respect to the light
        if (triList[i].backFacing)
            for (int j=0; j<3; j++) // for each triangle vertex,
                Vertex4f(V.x*L.w-L.x*V.w, V.y*L.w-L.y*V.w,
                         V.z*L.w-L.z*V.w, 0); // infinite
        else
            for (int j=0; j<3; j++) // for each triangle vertex
                Vertex4f(V.x,V.y,V.z,V.w);
End(); // triangles
```
      c. Configure zfail stencil testing to decrement stencil for front-facing polygons that fail the depth test.
         CullFace(BACK); StencilOp(KEEP,DECR,KEEP);
      f. Repeat steps (c) and (d) above, this time rendering front facing polygons rather than back facing ones.
   D. Position and enable the current light (and otherwise configure the light's attenuation, color, etc.).
      Enable(LIGHT0);
      Lightfv(LIGHT0, POSITION, ¤tLightPosition.x);
   E. Set stencil testing to render only pixels with a zero stencil value, i.e., visible fragments illuminated by the current light. Use equal depth testing to update only the visible fragments. Re-enable color buffer writes again.
      StencilFunc(EQUAL, 0, ~0); StencilOp(KEEP,KEEP,KEEP);
      DepthFunc(EQUAL); ColorMask(1,1,1,1);

TABLE #7-continued

```
    F.  Re-draw the scene to add the contribution of the current
        light to illuminated (non-shadowed) regions of the
        scene.
        drawScene();
    G.  Restore the depth test to less.
        DepthFunc(LESS);
 7. Disable blending and stencil testing; re-enable depth writes.
    Disable(BLEND); Disable(STENCIL_TEST); DepthMask(1);
```

Possible silhouette edges form closed loops. If a loop of possible silhouette edges is identified, then sending QUAD_STRIP primitives (2 vertices/projected quad), rather than independent quads (4 vertices/projected quad) will reduce the per-vertex transformation overhead per shadow volume quad. Similarly the independent triangle rendering used for capping the shadow volumes can be optimized for rendering as triangle strips or indexed triangles.

In the case of a directional light, all the vertices of a possible silhouette edge loop project to the same point at infinity. In this case, a TRIANGLE_FAN primitive can render these polygons extremely efficiently (1 vertex/projected triangle). If the application determines that the shadow volume geometry for a silhouette edge loop will never pierce or otherwise require capping of the near clip plane visible region, zpass shadow volume rendering can be used instead of zfail rendering. The zpass formulation is advantageous in this context because it does not require the rendering of any capping triangles. Mixing the zpass and zfail shadow volume stencil testing formulations for different silhouette edge loops does not affect the net shadow depth count as long as each particular loop uses a single formulation.

Shadow volume geometry can be re-used from frame to frame for any light and occluder that have not changed positions relative to each other.

DirectX™ 6 and the OpenGL® EXT_stencil_wrap extension provide two additional increment wrap and decrement wrap stencil operations that use modulo, rather than saturation, arithmetic. These operations reduce the likelihood of incorrect shadow results due to an increment operation saturating a stencil value shadow depth count. Using the wrapping operations with an N-bit stencil buffer, there remains a remote possibility that a net 2 N increments (or a multiple of) may alias with the unshadowed zero stencil value and lead to incorrect shadows, but in practice, particularly with an 8-bit stencil buffer, this is quite unlikely.

As mentioned earlier, depth clamping may be provided. When enabled, depth clamping disables the near and far clip planes for rasterizing geometric primitives. Instead, a fragment window-space depth value is clamped to the range [min(zn,zf),max(zn,zf)] where zn and zf are the near and far depth range values.

Additionally when depth clamping is enabled, no fragments with non-positive $w_c$ are generated. With depth clamping support, a conventional projection matrix with a finite far clip plane distance can be used rather than the Pinf form. The only required modification to the algorithm is enabling DEPTH_CLAMP_NV during the rendering of the shadow volume geometry.

Depth clamping recovers the depth precision (admittedly quite marginal) lost due to the use of a Pinf projection matrix. More significantly, depth clamping generalizes the algorithm so it works with orthographic, not just perspective, projections.

One may also use two-sided stencil testing, a stencil functionality that uses distinct front-and back-facing stencil state when enabled. Front-facing primitives use the front-facing stencil state for their stencil operation while back-facing primitives use the back-facing state. With two-sided stencil testing, shadow volume geometry need only be rendered once, rather than twice.

Two-sided stencil testing generates the same number of stencil buffer updates as the two-pass approach so in fill-limited shadow volume rendering situations, the advantage of a single pass is marginal. However, pipeline bubbles due to repeated all front-facing or all back-facing shadow volumes lead to inefficiencies using two passes. Perhaps more importantly, two-sided stencil testing reduces the CPU overhead in the driver by sending shadow volume polygon geometry only once.

Effective shadow volume culling schemes are helpful to achieve consistent interactive rendering rates for complex shadowed scenes. Portal, binary space partitioning (BSP), occlusion, and view frustum culling techniques can all improve performance by avoiding the rendering of unnecessary shadow volumes. Additional performance scaling may be achieved through faster and cleverer hardware designs that are better tuned for rendering workloads including stenciled shadow volumes.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents. The order of elements within claims does not indicate any particular order of steps or operations.

What is claimed is:

1. A method for depth clamping in a hardware graphics pipeline, comprising:

identifying a depth value;

determining whether a hardware graphics pipeline is operating in a depth clamping mode; and if the hardware graphics pipeline is operating in the depth clamping mode, clamping the depth value within a predetermined range utilizing the hardware graphics pipeline;

wherein the predetermined range is defined by a near plane and a far plane, and the depth value is clamped if it is less than the near plane or greater than the far plane.

2. The method as recited in claim 1, wherein the depth value is associated with a primitive.

3. The method as recited in claim 1, wherein the depth value is associated with a clipped portion of a primitive.

4. The method as recited in claim 1, wherein the depth value is associated with a pixel.

5. The method as recited in claim 1, wherein the depth value is associated with a fragment.

6. The method as recited in claim 1, wherein the clamping is carried out in a raster operation (ROP) module of the hardware graphics pipeline.

7. The method as recited in claim 1, wherein the predetermined range is programmable.

8. The method as recited in claim 1, wherein it is determined whether the hardware graphics pipeline is operating in the depth clamping mode utilizing a control bit.

9. The method as recited in claim 8, wherein the control bit indicates that the hardware graphics pipeline is not operating in the depth clamping mode by default.

10. The method as recited in claim 1, wherein the depth clamping mode is defined by a graphics application program interface.

11. The method as recited in claim 1, wherein the depth clamping mode is defined by an extension to a graphics application program interface.

12. The method as recited in claim 1, and further comprising performing a second clamping of the depth value within a second predetermined range utilizing the hardware graphics pipeline.

13. The method as recited in claim 12, wherein the second predetermined range is defined between zero (0) and a maximum value associated with the hardware graphics pipeline, and the depth value is clamped if it is less than zero (0) or greater than the maximum value.

14. The method as recited in claim 1, and further comprising converting the depth value from a first representation to a second representation.

15. The method as recited in claim 14, wherein the first representation is a fixed-point representation and the second representation is a floating-point representation.

16. The method as recited in claim 14, wherein the first representation is a floating-point representation and the second representation is a fixed-point representation.

17. The method as recited in claim 1, wherein if the hardware graphics pipeline is not operating in the depth clamping mode, further comprising performing a clipping operation.

18. The method as recited in claim 17, wherein the clipping operation is carried out in a raster operation (ROP) module of the hardware graphics pipeline.

19. The method as recited in claim 1, wherein the depth value is clamped for shadow volume rendering.

20. A computer program product for depth clamping in a hardware graphics pipeline, comprising:

computer code for identifying a depth value;

computer code for determining whether a hardware graphics pipeline is operating in a depth clamping mode; and computer code for clamping the depth value within a predetermined range utilizing the hardware graphics pipeline, if the hardware graphics pipeline is operating in the depth clamping mode;

wherein the predetermined range is defined by a near plane and a far plane, and the depth value is clamped if it is less than the near plane or greater than the far plane.

21. A system for depth clamping in a hardware graphics pipeline, comprising:

logic for identifying a depth value;

logic for determining whether a hardware graphics pipeline is operating in a depth clamping mode; and logic for clamping the depth value within a predetermined range utilizing the hardware graphics pipeline, if the hardware graphics pipeline is operating in the depth clamping mode;

wherein the predetermined range is defined by a near plane and a far plane, and the depth value is clamped if it is less than the near plane or greater than the far plane.

22. A system for depth clamping in a hardware graphics pipeline, comprising:

means for identifying a depth value;

means for determining whether a hardware graphics pipeline is operating in a depth clamping mode; and means for clamping the depth value within a predetermined range utilizing the hardware graphics pipeline, if the hardware graphics pipeline is operating in the depth clamping mode;

wherein the predetermined range is defined by a near plane and a far plane, and the depth value is clamped if it is less than the near plane or greater than the far plane.

23. A data structure for depth clamping stored in memory in a hardware graphics pipeline, comprising:

a control object for indicating whether a hardware graphics pipeline is operating in a depth clamping mode;

wherein a depth value is clamped within a predetermined range utilizing the hardware graphics pipeline, if the control object indicates that the hardware graphics pipeline is operating in the depth clamping mode;

wherein the predetermined range is defined by a near plane and a far plane, and the depth value is clamped if it is less than the near plane or greater than the far plane.

24. The method as recited in claim 13, wherein the first clamping includes:

determining whether the depth value associated with a fragment is less than a near plane value associated with the near plane, clamping the depth value to the near plane value if it is determined that the depth value is less than the near plane value, determining whether the depth value is greater than a far plane value associated with the far plane, and clamping the depth value to the far plane value if it is determined that the depth value is greater than the far plane value;

wherein the second clamping operation includes:

determining whether the depth value is less than zero (0), clamping the depth value to zero (0) if it is determined that the depth value is less than zero (0), determining whether the depth value is greater than the maximum value associated with the hardware graphics pipeline, and clamping the depth value to the maximum value if it is determined that the depth value is greater than the maximum value associated with the hardware graphics pipeline.

* * * * *